(12) United States Patent
Matias

(10) Patent No.: US 9,377,827 B2
(45) Date of Patent: Jun. 28, 2016

(54) LINKAGE APPARATUS FOR CONNECTING KEYPAD TO WIRELESS KEYBOARD AND METHODS OF USING THE SAME

(71) Applicant: Edgar Matias, Toronto (CA)

(72) Inventor: Edgar Matias, Toronto (CA)

(73) Assignees: Other World Computing, Inc., Woodstock, IL (US); The Matias Corporation, Toronto (CA)

( * ) Notice: Subject to any disclaimer, the term of this patent is extended or adjusted under 35 U.S.C. 154(b) by 51 days.

(21) Appl. No.: 14/175,824

(22) Filed: Feb. 7, 2014

(65) Prior Publication Data

US 2015/0201508 A1 Jul. 16, 2015

Related U.S. Application Data

(60) Provisional application No. 61/926,375, filed on Jan. 12, 2014.

(51) Int. Cl.
*G06F 1/16* (2006.01)
*G06F 1/18* (2006.01)
*G06F 3/02* (2006.01)

(52) U.S. Cl.
CPC .............. *G06F 1/189* (2013.01); *G06F 3/0202* (2013.01); *Y10T 24/44769* (2015.01)

(58) Field of Classification Search
CPC combination set(s) only.
See application file for complete search history.

(56) References Cited

U.S. PATENT DOCUMENTS

| | | | | |
|---|---|---|---|---|
| 4,488,146 A | * | 12/1984 | Burchart | 340/407.2 |
| 4,564,751 A | * | 1/1986 | Alley et al. | 235/146 |
| 5,073,050 A | * | 12/1991 | Andrews | 400/82 |
| 5,190,387 A | * | 3/1993 | Auth | 400/717 |
| 5,687,058 A | * | 11/1997 | Roylance | 361/679.14 |
| 5,865,546 A | * | 2/1999 | Ganthier et al. | 400/489 |
| 6,104,604 A | * | 8/2000 | Anderson et al. | 361/679.55 |
| 6,266,234 B1 | * | 7/2001 | Leman | 361/679.11 |
| 6,317,061 B1 | * | 11/2001 | Batra et al. | 341/22 |
| 6,902,332 B2 | * | 6/2005 | McLoone | 400/472 |
| 6,965,076 B2 | * | 11/2005 | Wu | 174/541 |
| 7,086,634 B1 | * | 8/2006 | Kirchhoff | 248/286.1 |
| 8,238,084 B2 | * | 8/2012 | Chen et al. | 361/679.14 |
| 2001/0000616 A1 | * | 5/2001 | West et al. | 248/118 |
| 2004/0080899 A1 | * | 4/2004 | Hill et al. | 361/680 |
| 2014/0043746 A1 | * | 2/2014 | Lai et al. | 361/679.17 |

* cited by examiner

*Primary Examiner* — Lisa Lea Edmonds

(74) *Attorney, Agent, or Firm* — Scherrer Patent & Trademark Law, P.C.; Stephen T. Scherrer; Monique A. Morneault

(57) ABSTRACT

The present invention relates to a linkage apparatus for connecting a wireless keypad to a wireless keyboard. The linkage apparatus provides a unitary keyboard and keypad system, and further allows a user to easily engage the power and Bluetooth® link buttons on one or both of the keypad and the keyboard. Methods of using the same are further provided.

18 Claims, 4 Drawing Sheets

LINKAGE APPARATUS FOR CONNECTING KEYPAD TO WIRELESS KEYBOARD AND METHODS OF USING THE SAME

The present invention claims priority under 35 U.S.C. 119 (e) as a nonprovisional application of U.S. Provisional Patent App. No. 61/926,375, titled "Bracket Apparatus for Connecting Keypad to Wireless Keyboard and Methods of Using the Same", filed Jan. 12, 2014, incorporated herein by reference in its entirety.

TECHNICAL FIELD

The present invention relates to a linkage apparatus for connecting a wireless keypad to a wireless keyboard. The linkage apparatus provides a unitary keyboard and keypad system, and further allows a user to easily engage the power and Bluetooth® link buttons on one or both of the keypad and the keyboard. Methods of using the same are further provided.

BACKGROUND

Apple® computers, such as, for example, Apple iMac® computers, as well as other like computers, utilize wireless keyboards for users to input when using the computers. The Apple® wireless keyboard is relatively thin, metallic in color with white keyboard buttons that have low profiles. However, the Apple® wireless keyboard does not also include a wireless keypad for entering numbers, mathematical functions, and other like buttons. Third parties provide a third party add-on wireless keypad for users to utilize. FIG. 1 illustrates the prior art Apple® wireless keyboard 1.

However, typical wireless keypads, while operatively linked to the wireless keyboard and/or the computer, are stand-alone units, and as such do not allow a user easy access unless placed directly next to the wireless keyboard. However, because the wireless keypad is a stand-alone unit, the wireless keypad may be moved during use thereof, may become lost or misplaced, and otherwise may become inaccessible to a user, making it difficult for the user to utilize the same. A need, therefore, exists for an apparatus for linking a wireless keypad to a wireless keyboard. For example, a need exists for an apparatus for linking a wireless keypad to a wireless keyboard, such as linking Apple® computers' wireless keyboard to a numeric keypad.

Heretofore, solutions to provide a linkage or otherwise connect a wireless keypad to a wireless keyboard, especially Apple® computer's wireless keyboard with a wireless numeric keypad, simply do not allow a user easy control of the same when in use. Specifically, the Apple® wireless keyboard, for example, includes a combination power and wireless connection button on the right side in the upper right corner of the wireless keyboard (when facing the keyboard from above) that is covered by the linkage. Likewise, typical stand-alone wireless numeric keypads also include a combination power and wireless connection button on the right side in the upper right corner of the wireless keypad (when facing the keyboard from above). Moreover, typical numeric keypads typically have battery compartments on the left side thereof, in an upper left corner of the wireless keypad. Linking of the wireless keyboard with a typical numeric keypad generally covers the battery compartment, requiring a user to separate the keypad from the linkage apparatus to change the batteries. A need, therefore, further exists for providing an apparatus for linking a wireless keyboard to a wireless keypad that allows a user to engage the power buttons and/or the wireless connection buttons, such as Bluetooth buttons, of both the wireless keyboard and the wireless keypad. Moreover, a need exists for providing an apparatus for linking a wireless keyboard to a wireless keypad that allows a user to easily change batteries in both the wireless keyboard and the wireless keypad without being removed from the linkage apparatus.

The prior art solutions, while linking the wireless keyboard and the wireless keypad together, effectively blocks access to the power and wireless connection button that is disposed on the side of the wireless keyboard. Moreover, prior art solutions block access to battery compartments on prior art wireless keypads. Thus, a user must ensure that the power buttons have been pressed and that batteries are fresh prior to linking the keyboard and the keypad together via the linkage. Moreover, if either the wireless keyboard or wireless keypad, or both, suffer a break in the wireless communication with the computer, then a user must remove the linkage to access the wireless connection button, such as the Bluetooth buttons.

A need, therefore, further exists for providing an apparatus for linking a wireless keypad to a wireless keyboard, while providing a channel for a user to access the combination power and wireless connection buttons on both the wireless keypad and the wireless keyboard. More specifically, a need exists for providing an apparatus for linking the wireless keypad to a wireless keyboard that allows a user to place his or her finger on the combination power and wireless connection buttons at the same time the apparatus links the wireless keypad to the wireless keyboard, without removal of the same to gain access thereto.

SUMMARY OF THE INVENTION

The present invention relates to a linkage apparatus for connecting a wireless keypad to a wireless keyboard. The linkage apparatus provides a unitary keyboard and keypad system, and further allows a user to easily engage the power and Bluetooth® link buttons on one or both of the keypad and the keyboard. Methods of using the same are further provided.

To this end, in an embodiment of the present invention, a linkage apparatus is provided. The linkage apparatus comprises a first end and a second end and a bar between the first end and the second end; a first engaging slot on a first side of the bar running roughly from the first end to the second end for engaging a side of a wireless keyboard, and a second engaging slot on a second side of the bar running roughly from the first end to the second end for engaging a side of the wireless keypad; a first engaging channel at the first end of the apparatus on the first side thereof for engaging with a wireless keyboard; and a second engaging channel at the first end of the apparatus on the second side thereof for engaging with a wireless keypad, wherein the first and second channels provide user access to the combination power and wireless connection buttons on the wireless keyboard and wireless keypad, respectively.

In a preferred embodiment of the present invention a linkage apparatus for joining a computer keyboard to a number pad is provided. The linkage apparatus comprises: a first end and a second end and a bar between the first end and the second end; a first engaging slot on a first side of the bar running roughly from the first end to the second end for engaging a side of the computer keyboard; and a second engaging slot on a second side of the bar running roughly from the first end to the second end for engaging a side of the number pad.

In an embodiment, the linkage apparatus further comprises a first engaging channel at the first end of the apparatus on the first side thereof for engaging with the keyboard.

In an embodiment, the linkage apparatus further comprises a first engaging channel at the first end of the apparatus on the first side thereof for engaging with the computer keyboard; and a second engaging channel at the first end of the apparatus on the second side thereof for engaging with the number pad.

In an embodiment, the linkage apparatus further comprises an opening at the first end for allowing a user to press a power button disposed on a side of the computer keyboard when the computer keyboard is engaged with the first slot.

In an embodiment, the opening is on an underside of the first end of the linkage apparatus.

In an embodiment, the opening allows a user to press a power button disposed on a side of the number pad when the number pad is engaged with the second slot.

In an embodiment, the computer keyboard is a wireless Mac® keyboard having a plurality of keys disposed on a flat surface and a tubular base at a top end thereof holding batteries and a power button on a right side thereof, wherein the first engaging channel engages the tubular base when the computer keyboard is engaged with the first slot.

In an embodiment, the number pad is a wireless Mac® compatible number pad having a plurality of keys disposed on a flat surface and a tubular base on a top end thereof holding batteries and a power button on a left side thereof, wherein the second engaging channel engages the tubular base of the number pad when the number pad is engaged with the second slot.

In an alternate embodiment of the present invention, a system for joining a computer keyboard to a number pad is provided. The system comprises: a computer keyboard; a number pad; and a linkage apparatus comprising a first end and a second end and a bar between the first end and the second end, a first engaging slot on a first side of the bar running roughly from the first end to the second end for engaging a side of the computer keyboard, and a second engaging slot on a second side of the bar running roughly from the first end to the second end for engaging a side of the number pad.

In an embodiment, the system further comprises a first engaging channel at the first end of the linkage apparatus on the first side thereof for engaging with the keyboard.

In an embodiment, the system further comprising a first engaging channel at the first end of the linkage apparatus on the first side thereof for engaging with the computer keyboard; and a second engaging channel at the first end of the apparatus on the second side thereof for engaging with the number pad.

In an embodiment, the system further comprises an opening at the first end of the linkage apparatus for allowing a user to press a power button disposed on a side of the computer keyboard when the computer keyboard is engaged with the first slot.

In an embodiment, the opening is on an underside of the first end of the linkage apparatus.

In an embodiment, the opening allows a user to press a power button disposed on a side of the number pad when the number pad is engaged with the second slot of the linkage apparatus.

In an embodiment, the computer keyboard is a wireless Mac® keyboard having a plurality of keys disposed on a flat surface and a tubular base on a top end thereof holding batteries and a power button on a right side thereof, wherein the first engaging channel engages the tubular base when the computer keyboard is engaged with the first slot.

In an embodiment, the number pad is a wireless Mac® compatible number pad having a plurality of keys disposed on a flat surface and a tubular base at a top end thereof holding batteries and a power button on a left side thereof, wherein the second engaging channel engages the tubular base of the number pad when the number pad is engaged with the second slot.

In an embodiment, the number pad is a wireless Mac® compatible number pad having a plurality of keys disposed on a flat surface and a tubular base at a top end thereof holding a plurality of batteries therein, wherein the number pad further comprises a power button on the left side of the number pad.

In an embodiment, the tubular base runs from a first side of the number pad to a second side of the number pad.

In an embodiment, the power button of the number pad is disposed on a left side of the tubular base.

In an embodiment, the tubular base of the number pad uses AAA batteries for powering the number pad, and electronic components are disposed in the tubular base for operating the number pad.

It is, therefore, an advantage and objective of the present invention to provide an apparatus for linking a wireless keypad to a wireless keyboard.

For example, it is an advantage and objective of the present invention to provide an apparatus for linking a wireless keypad to a wireless keyboard, such as linking Apple® computers' wireless keyboard to a stand-along wireless numeric keypad.

Moreover, it is an advantage and objective of the present invention to provide an apparatus for linking a wireless keyboard to a wireless keypad that allows a user to engage the power buttons and/or the wireless connection buttons, such as Bluetooth buttons, of both the wireless keyboard and the wireless keypad.

Moreover, it is an advantage and objective of the present invention to provide an apparatus for linking a wireless keyboard to a wireless keypad that allows a user to easily change batteries in both the wireless keyboard and the wireless keypad without being removed from the linkage apparatus.

Further, it is an advantage and objective of the present invention to provide an apparatus for linking a wireless keypad to a wireless keyboard, while providing a channel for a user to access the combination power and wireless connection buttons on both the wireless keypad and the wireless keyboard.

More specifically, it is an advantage and objective of the present invention to provide an apparatus for linking the wireless keypad to a wireless keyboard that allows a user to place his or her finger on the combination power and wireless connection buttons at the same time the apparatus links the wireless keypad to the wireless keyboard, without removal of the same to gain access thereto.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to a linkage apparatus for connecting a wireless keypad to a wireless keyboard. The linkage apparatus provides a unitary keyboard and keypad system, and further allows a user to easily engage the power and Bluetooth® link buttons on one or both of the keypad and the keyboard. Methods of using the same are further provided.

Figure 1:
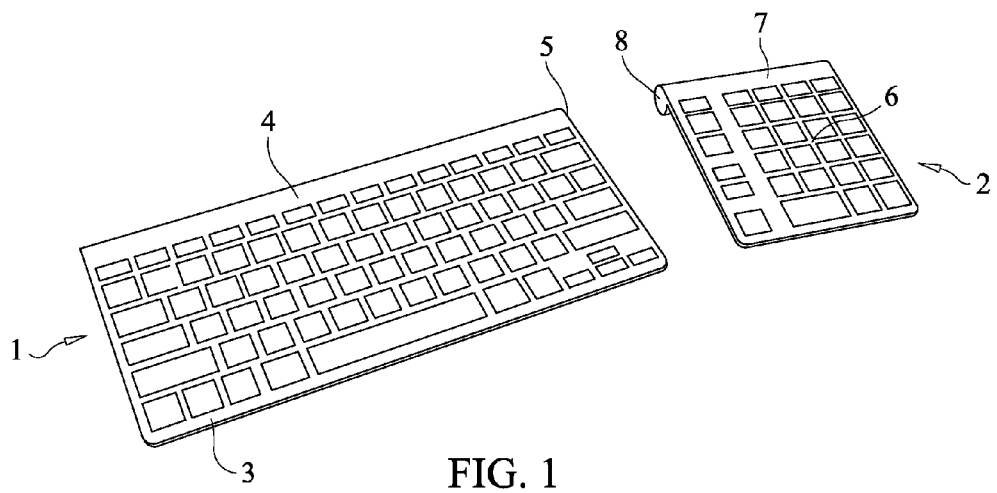
FIG. 1 illustrates a perspective view of an Apple® wireless keyboard as prior art to the present invention and a wireless numeric keypad.

Now referring to the figures, wherein like numerals refer to like parts, FIG. 1 illustrates a perspective view of a prior art Apple® computers wireless keyboard 1 that is typically utilized with Apple® computers such as the iMac® line of computers. A wireless numeric keypad 2 is further illustrated in FIG. 1. As shown, the wireless keyboard 1 and the wireless numeric keypad 2 are separate stand-alone devices.

The wireless keyboard 1 may have a flat surface 3 having a plurality of keyboard buttons thereon and a support barrel 4 disposed on an upper end thereof. The support barrel 4 may have a plurality of functions. First, the support barrel 4 supports the keyboard 1 and disposes the flat surface 3 into a ramp configuration, angling the same when disposed on a surface, such as a desk or table. Second, the support barrel 4 contains a plurality of batteries (not shown) for powering the wireless keyboard 1. Access to the battery compartment is provided on a left side of the support barrel 4. Third, the support barrel houses a combination power and wireless connection button 5 on a right side thereof, allowing a user to power the wireless keyboard 1 and/or wirelessly connect the wireless keyboard 1 to a computer (not shown) by pressing the button 5.

Likewise, the wireless numeric keypad 2 may also have a flat surface 6 having a plurality of keypad buttons thereon and a support barrel 7 disposed on an upper end thereof, also having a plurality of functions. First the support barrel 7 supports the keypad 2 and disposes the flat surface 6 into a ramp configuration, angling the same when disposed on a surface, such as a desk or table. Second, the support barrel 7 contains a plurality of batteries (not shown) for powering the wireless keypad 2. Access to the battery compartment is provided on a right side of the support barrel 7. Third, the support barrel 7 houses a combination power and wireless connection button 8 on a left side thereof, allowing a user to power the wireless numeric keypad 2 and/or wireless connect the wireless keypad 2 to a computer (not shown) by pressing the button.

It should be noted that the combination power and wireless connection button 5 of the wireless keyboard 1 and the wireless connection button 8 of the wireless keypad 2 face each other when the keypad 2 is placed adjacent the keyboard 1 on a right side of the keyboard 1. This may allow a user to have easy access to both the combination power and wireless connection buttons 5, 8 when linked together, as provided in further detail below.

Figure 2:
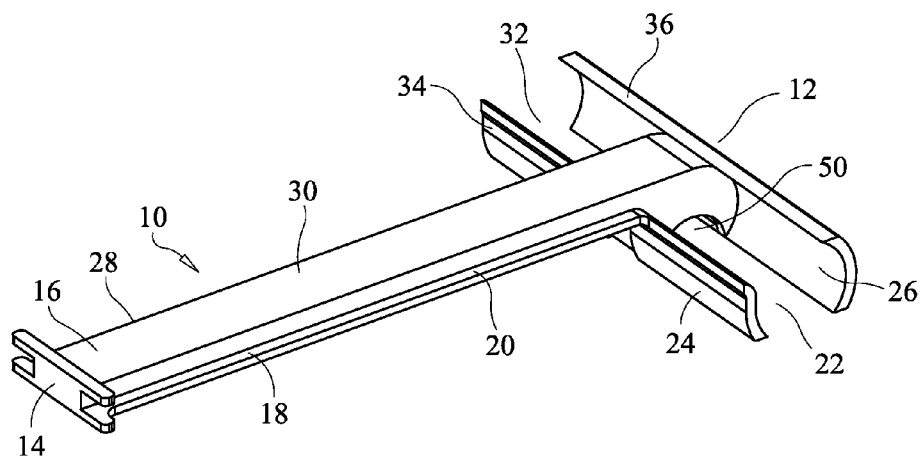
FIG. 2 illustrates a perspective view of a linkage apparatus for linking a wireless keypad to a wireless keyboard in an embodiment of the present invention.

FIG. 2 illustrates a linkage apparatus 10 in an embodiment of the present invention. Specifically, the linkage apparatus 10 is utilized to link both the wireless keyboard 1 and the wireless numeric keypad 2 together into a single unit. Specifically, the linkage apparatus 10 may comprise a first end 12 and a second end 14 and a bar 16 between the first and second ends 12, 14. The apparatus 10 may be roughly the size of the wireless keyboard 1 and/or the wireless keypad 2 to engage the sides thereof, as disclosed in more detail below.

Disposed on a first side 18 of the apparatus 10 may be a first track or slot 20 for engagement with a right side of the numeric keypad 2 to frictionally engage the numeric keypad 2 to the linkage apparatus 10. Also on a first side 18 of the apparatus 10, at the first end 12 thereof, a channel 22 may be provided, the channel 22 comprising a first engaging flange 24 and a second engaging flange 26 forming the channel 22. The first and second engaging flanges 24, 26 may each have a curved shape, thereby forming a relatively rounded channel 22 that may engage the rounded barrel 7 of the numeric keypad 2, frictionally holding the barrel 7 of the numeric keypad 2 therein, as illustrate in FIGS. 4 and 5.

Figure 4:
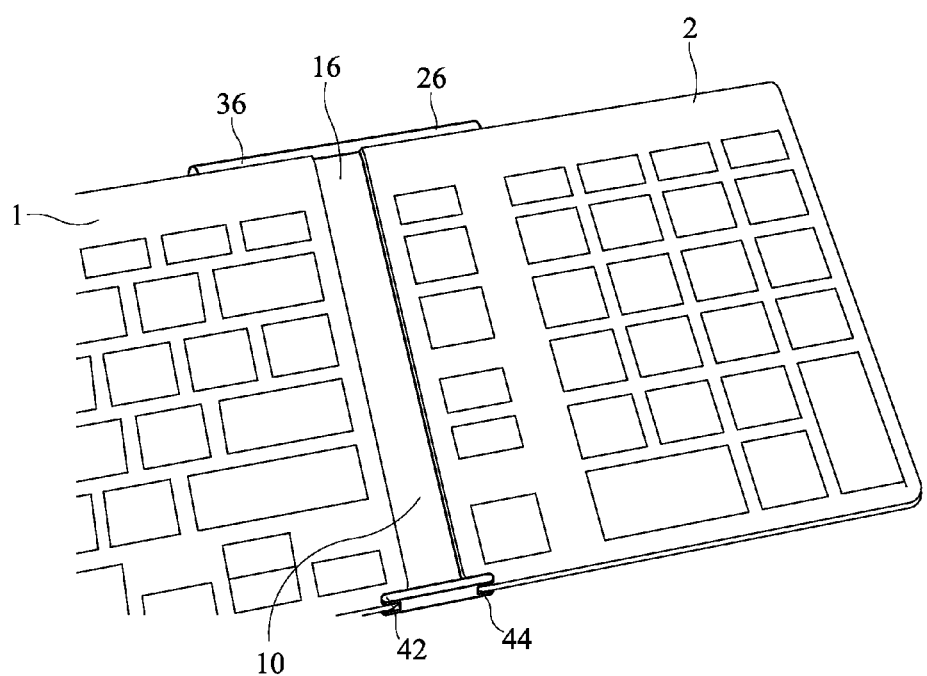
FIG. 4 illustrates a perspective view of a linkage apparatus engaging both a wireless keyboard and a wireless keypad to link the same together in an embodiment of the present invention.
Figure 5:
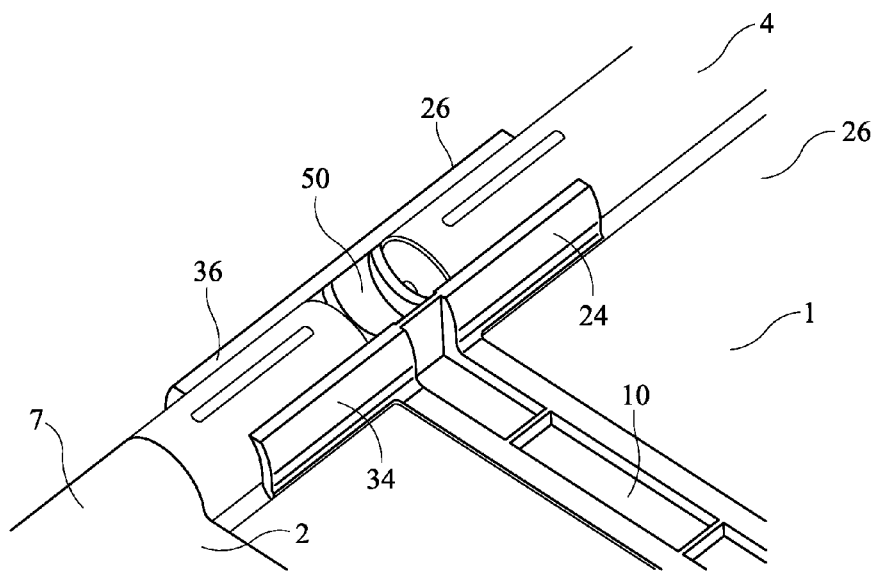
FIG. 5 illustrates a bottom perspective view of a linkage apparatus engaging both a wireless keyboard and a wireless keypad to link the same together and providing access to the combination power and wireless connection buttons of both the wireless keyboard and the wireless keypad.

The barrel 7 of the numeric keypad 2, thus, may be placed within the channel 22 formed by the first and second flanges 24, 26 as illustrated in FIGS. 4 and 5. Moreover, as illustrated in FIGS. 4 and 5, the left side of the keypad 2 may be engaged with the track or slot 20 to hold the numeric keypad 2 rigidly with the linkage apparatus 10.

Likewise, on a second side 28 of the apparatus 10 may be disposed a second track or slot 30 for engagement with a right side of the wireless keyboard 1 to frictionally engage the wireless keyboard 1 to the linkage apparatus 10. Also on the second side 28 of the apparatus 10, at the first end 12 thereof, a channel 32 may be provided, the channel 32 comprising a first engaging flange 34 and a second engaging flange 36 forming the channel 32. The first and second engaging flanges 34, 36 may have a curved shaped, thereby forming a rounded channel 32 that may engage the rounded barrel 4 of the wireless keyboard 1, frictionally holding the barrel 4 of the wireless keyboard 1 therein, as illustrate in FIGS. 4 and 5.

The barrel 4 of the wireless keyboard 1, thus, may be placed within the channel 32 formed by the first and second flanges 34, 36 as illustrated in FIGS. 4 and 5. Moreover, as illustrated in FIGS. 4 and 5, the right side of the wireless keyboard 1 may be engaged with the track or slot 30 to hold the wireless keyboard 1 rigidly with the linkage apparatus 10.

Figure 3:
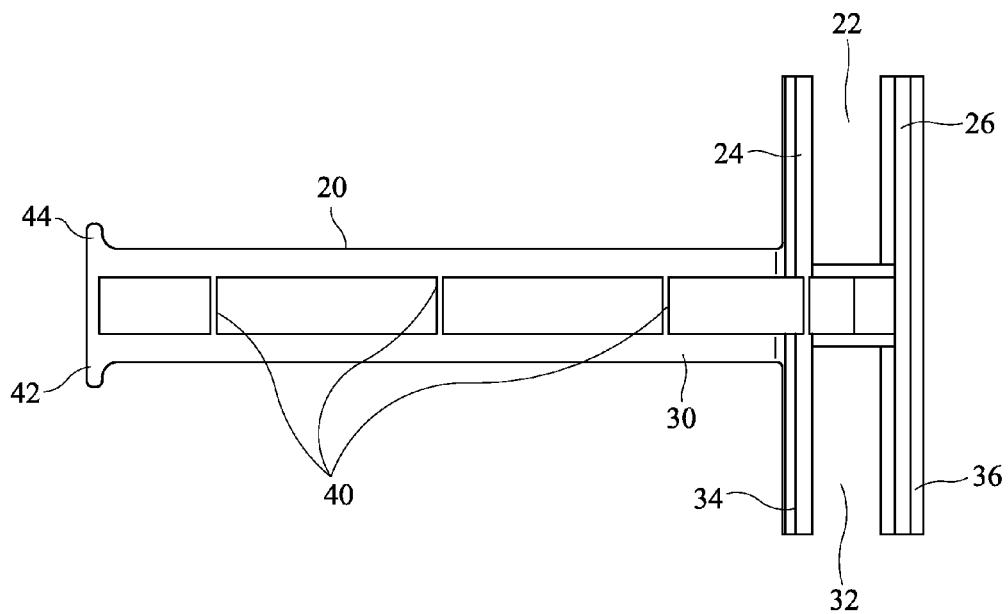
FIG. 3 illustrates a bottom view of a linkage apparatus for linking a wireless keypad to a wireless keyboard in an embodiment of the present invention.

FIG. 3 illustrates a bottom view of the linkage apparatus 10, showing a plurality of ribs 40 that may be laterally disposed across the linkage apparatus 10 to strengthen the bar 16. Further, the channels 22, 32 are illustrated for engaging the barrels 4, 7 of the wireless keyboard 1 and numeric keypad 2, respectively. Further, the tracks or slots 20, 30 on the first and second sides 18, 28, respectively, of the linkage apparatus 10 are illustrated in FIG. 3 as engaging the sides of the wireless keyboard 1 and the numeric keypad 2. Further, first and second engaging stops 42, 44 may be provided for providing additional rigid frictional engagement of the linkage apparatus 10 with the wireless keyboard 1 and the numeric keypad 2.

Figure 6:
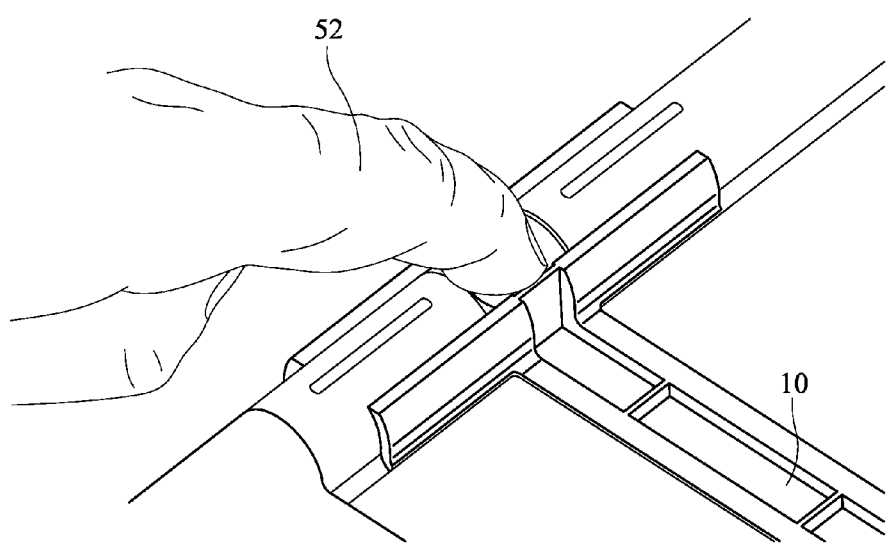
FIG. 6 illustrates a bottom perspective view of a linkage apparatus and a user engaging a power and wireless connection button of either a wireless keyboard or a wireless numeric keypad in an embodiment of the present invention.

The bar 16 of the apparatus 10 may further have a cut-away portion 50 disposed on the first end 12 on a bottom thereof. The cut-away portion 50 provides access to the combination power and wireless connection buttons 5, 8 of the wireless keyboard 1 and numeric keypad 2, respectively, when both are frictionally linked with the linkage apparatus 10, as illustrated in FIGS. 4 and 5. Specifically, as shown in FIG. 5, the cut-away portion 50 provides access to the combination power and wireless connection buttons 5, 8 of the wireless keyboard 1 and the numeric keypad 2, respectively. Specifically, a user may engage his or her finger 52 with either or both of the combination power and wireless connection buttons 5, 8 of the wireless keyboard 1 and the numeric keypad 2, respectively, as shown in FIG. 6.

In a preferred embodiment, the numeric keypad 2 may be relatively thin, which may allow the numeric keypad 2 to be more easily adapted and engageable with the wireless keyboard 1 as shown and disclosed herein. A preferred numeric keypad 102 is illustrated in FIG. 8 showing a flat surface 106 having keypad buttons thereon, and a support barrel 107 disposed on a top end thereof.

Figure 7:
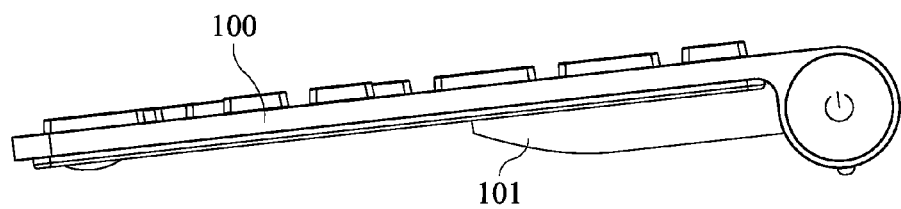
FIG. 7 illustrates a side view of a prior art numeric keypad.

The preferred numeric keypad 102 utilizes a variety of electronic components for utilization thereof, especially as described herein, and the present invention provides a much thinner package and profile, especially as compared to a prior art numeric keypad 100, shown in FIG. 7. Specifically, the prior art numeric keypad 100 has a relatively large bulge 101 for housing the necessary electronic components of the prior art numeric keypad 100. Moreover, the prior art numeric keypad 100 utilizes AA batteries, which take up the entirety of space within its support barrel. Moreover, as illustrated in FIG. 7, the prior art numeric keypad has a combination power and wireless connection button disposed on a right side of its support barrel. Therefore, the battery compartment of the prior art numeric keypad 100 is disposed on a left side of its support barrel. Utilization of the prior art keypad 100 with the linkage apparatus 10 of the present invention would prohibit access to the battery compartment of the prior art numeric keypad 100 unless the keypad 100 is removed from the linkage apparatus 10.

Figure 8:
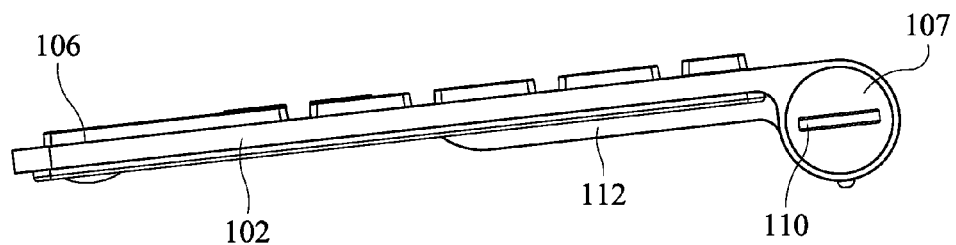
FIG. 8 illustrates a side view of a wireless numeric keypad in a preferred embodiment of the present invention.

As illustrated in FIG. 8, the preferred numeric keypad 102 has a battery compartment on its right side, and access is provided via a battery compartment cap 110. Thus, when the preferred numeric keypad 102 is linked to a wireless keyboard via the linkage apparatus 10, the battery compartment may still be accessible without removing the numeric keypad 102 from the linkage apparatus 10. Further, because the combination power and wireless connection button (not shown in FIG. 8) is provided on the left side of the barrel 107, a user may have access to it, even when the numeric keypad 102 is linked to a wireless keyboard via the linkage apparatus 10, as described above.

Figure 9:
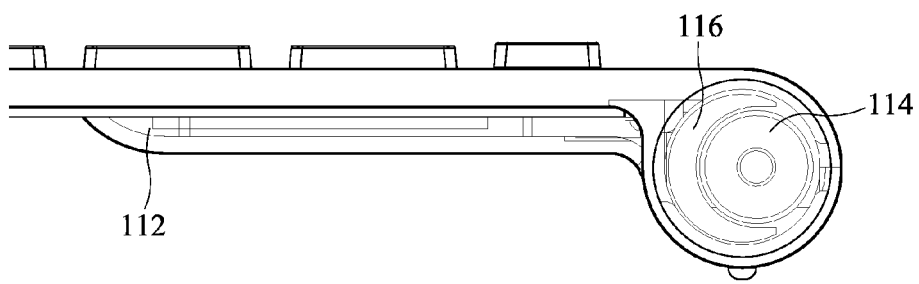
FIG. 9 illustrates a cut-away side view of a wireless keypad in a preferred embodiment of the present invention.

The electronic components of the numeric keypad 102 may be housed both in the battery compartment and in a much thinner bulge 112 disposed under the numeric keypad 102. Preferably, the numeric keypad 102 utilizes AAA batteries 114, as illustrated in FIG. 9, providing additional space 116 in the battery compartment to house necessary electronic components for workability of the numeric keypad 102.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A linkage apparatus for joining a computer keyboard to a number pad comprising:
    a first end and a second end and a bar between the first end and the second end;
    a first engaging slot on a first side of the bar running roughly from the first end to the second end and configured to engage a side of a computer keyboard;
    a second engaging slot on a second side of the bar running roughly from the first end to the second end configured to engage a side of a number pad; and
    an opening at the first end for allowing a user to press a power button disposed on a side of the computer keyboard when the computer keyboard is engaged with the first slot.

2. The linkage apparatus of claim 1 further comprising:
    a first engaging channel at the first end of the apparatus on the first side thereof for engaging with the keyboard.

3. The linkage apparatus of claim 1 further comprising:
    a first engaging channel at the first end of the apparatus on the first side thereof for engaging with the computer keyboard; and
    a second engaging channel at the first end of the apparatus on the second side thereof for engaging with the number pad.

4. The linkage apparatus of claim 1 wherein the opening is on an underside of the first end of the bracket apparatus.

5. The linkage apparatus of claim 1 wherein the opening allows a user to press a power button disposed on a side of the number pad when the number pad is engaged with the second slot.

6. The linkage apparatus of claim 2 wherein the computer keyboard is a wireless Mac® keyboard having a plurality of keys disposed on a flat surface and a tubular base at a top end thereof holding batteries and a power button on a right side thereof, wherein the first engaging channel engages the tubular base when the computer keyboard is engaged with the first slot.

7. The linkage apparatus of claim 3 wherein the number pad is a wireless Mac® compatible number pad having a plurality of keys disposed on a flat surface and a tubular base on a top end thereof holding batteries and a power button on a left side thereof, wherein the second engaging channel engages the tubular base of the number pad when the number pad is engaged with the second slot.

8. A system for joining a computer keyboard to a number pad comprising:
    a computer keyboard;
    a number pad; and
    a linkage apparatus comprising a first end and a second end and a bar between the first end and the second end, a first engaging slot on a first side of the bar running roughly from the first end to the second end for engaging a side of the computer keyboard, a second engaging slot on a second side of the bar running roughly from the first end to the second end for engaging a side of the number pad, and an opening at the first end of the bracket apparatus for allowing a user to press a power button disposed on a side of the computer keyboard when the computer keyboard is engaged with the first slot.

9. The system of claim 8 further comprising:
a first engaging channel at the first end of the linkage apparatus on the first side thereof for engaging with the keyboard.

10. The system of claim 8 further comprising:
a first engaging channel at the first end of the linkage apparatus on the first side thereof for engaging with the computer keyboard; and
a second engaging channel at the first end of the linkage apparatus on the second side thereof for engaging with the number pad.

11. The system of claim 8 wherein the opening is on an underside of the first end of the linkage apparatus.

12. The system of claim 8 wherein the opening allows a user to press a power button disposed on a side of the number pad when the number pad is engaged with the second slot of the linkage apparatus.

13. The system of claim 9 wherein the computer keyboard is a wireless Mac® keyboard having a plurality of keys disposed on a flat surface and a tubular base on a top end thereof holding batteries and a power button on a right side thereof, wherein the first engaging channel engages the tubular base when the computer keyboard is engaged with the first slot.

14. The system of claim 10 wherein the number pad is a wireless Mac® compatible number pad having a plurality of keys disposed on a flat surface and a tubular base at a top end thereof holding batteries and a power button on a left side thereof, wherein the second engaging channel engages the tubular base of the number pad when the number pad is engaged with the second slot.

15. The system of claim 8 wherein the number pad is a wireless Mac® compatible number pad having a plurality of keys disposed on a flat surface and a tubular base at a top end thereof holding a plurality of batteries therein, wherein the number pad further comprises a power button on the left side of the number pad.

16. The system of claim 15 wherein the tubular base runs from a first side of the number pad to a second side of the number pad.

17. The system of claim 16 wherein the power button of the number pad is disposed on a left side of the tubular base.

18. The system of claim 15 wherein the tubular base of the number pad uses AAA batteries for powering the number pad, and electronic components are disposed in the tubular base for operating the number pad.

* * * * *